United States Patent
Kudou et al.

(10) Patent No.: US 10,637,789 B2
(45) Date of Patent: Apr. 28, 2020

(54) WIRELESS TERMINAL DEVICE AND CONTROL METHOD THEREOF

(71) Applicant: NEC Corporation, Minato-ku, Tokyo (JP)

(72) Inventors: Masato Kudou, Tokyo (JP); Masakazu Ono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 591 days.

(21) Appl. No.: 14/916,250

(22) PCT Filed: Nov. 4, 2014

(86) PCT No.: PCT/JP2014/005545
§ 371 (c)(1),
(2) Date: Mar. 3, 2016

(87) PCT Pub. No.: WO2015/072108
PCT Pub. Date: May 21, 2015

(65) Prior Publication Data
US 2016/0205030 A1    Jul. 14, 2016

(30) Foreign Application Priority Data
Nov. 13, 2013   (JP) .................................. 2013-234549

(51) Int. Cl.
*H04L 12/835*    (2013.01)
*H04W 28/02*     (2009.01)
(Continued)

(52) U.S. Cl.
CPC ............ *H04L 47/30* (2013.01); *H04L 47/283* (2013.01); *H04W 28/02* (2013.01); *H04W 28/021* (2013.01); *H04W 84/18* (2013.01)

(58) Field of Classification Search
CPC .............................. H04W 28/02; H04L 47/30
See application file for complete search history.

(56) References Cited

U.S. PATENT DOCUMENTS 6,247,058 B1    6/2001  Miller et al.
9,444,751 B1 *  9/2016  Alresaini ................ H04L 47/30
(Continued)

FOREIGN PATENT DOCUMENTS

CN    1442960 A     9/2003
CN    102957608 A   3/2013
(Continued)

OTHER PUBLICATIONS

Paulo H Azeva Do et al: "A Packet Aggregation Mechanism for Real Time Applications over Wireless Networks", Parallel and Distributed Processing Workshops and PHD Forum (IPDPSW), 2011 IEEE International Symposium on, IEEE, May 16, 2011, pp. 648-655.

(Continued)

*Primary Examiner* — Derrick W Ferris
*Assistant Examiner* — Farhad Ali (57) ABSTRACT

A wireless terminal device (1) for use in a store-and-forward type wireless network includes a wireless communication unit (11), a memory (12), and a control unit (13). The memory (12) is coupled to the wireless communication unit (11) and is configured to store messages transferred via the wireless network. The control unit (13) is configured to adjust, based on first information, at least one of a maximum number and maximum retention time of messages stored in the memory (12). The first information relates to a degree of contribution of the wireless terminal device (1) to success in sending messages from a source node to a destination node via the wireless network. It is thus possible to provide, for example, an efficient memory control method suitable for a store-and-forward type wireless network.

27 Claims, 9 Drawing Sheets

(51) Int. Cl.
  *H04L 12/841* (2013.01)
  *H04W 84/18* (2009.01)

(56) References Cited

U.S. PATENT DOCUMENTS

| | | | |
|---|---|---|---|
| 2003/0169746 | A1 | 9/2003 | Kitazawa et al. |
| 2009/0010205 | A1* | 1/2009 | Pratt, Jr. ............... G01D 21/00 370/328 |
| 2010/0172456 | A1* | 7/2010 | Renaud ................. H04J 3/0632 375/371 |
| 2013/0094398 | A1* | 4/2013 | Das ...................... H04W 12/00 370/254 |
| 2013/0272286 | A1* | 10/2013 | Sharma ................. H04W 84/18 370/338 |

FOREIGN PATENT DOCUMENTS

| | | |
|---|---|---|
| JP | 2010-287993 A | 12/2010 |
| JP | 2012-119926 A | 6/2012 |
| JP | 2013-123130 A | 6/2013 |
| WO | 2009/078427 A | 6/2009 |
| WO | 2011/071045 A | 6/2011 |
| WO | 2013/076912 A | 5/2013 |

OTHER PUBLICATIONS

Extended European Search Report for EP Application No. EP14862722.7 dated on Jul. 17, 2017.
Islam, A. and Waldvogel, M. "Reality-Check for DTN Routing Algorithms," Distributed Computing Systems Workshops, 2008. ICDCS '08. 28th International Conference on, Jun. 17-20, 2008.
Z. Guo, et al., "Adaptive routing in underwater delay/disruption tolerant sensor networks," In Proceedings of the 5th Annual Conference on Wireless on Demand Network Systems and Services, Jan. 23-25, 2008.
Taiwanese Office Action for TW Application No. 103139102 dated on Dec. 19, 2016.
International Search Report for PCT Application No. PCT/JP2014/005545, dated Feb. 3, 2015.
Chinese Office Action for CN Application No. 201480058502.8 dated Jul. 3, 2018 with English Translation.
Indian Office Action for IN Application No. 201617008096 dated Dec. 26, 2019 with English Translation.

* cited by examiner

WIRELESS TERMINAL DEVICE AND CONTROL METHOD THEREOF

This application is a National Stage Entry of PCT/JP2014/005545 filed on Nov. 4, 2014, which claims priority from Japanese Patent Application 2013-234549 filed on Nov. 13, 2013, the contents of all of which are incorporated herein by reference, in their entirety.

TECHNICAL FIELD

This application relates to a wireless terminal for use in disruption/delay/disconnect tolerant networks.

BACKGROUND ART

A disruption tolerant network is a wireless multi-hop network including a plurality of communication nodes. A disruption tolerant network is also called "delay tolerant network" or "disconnect tolerant network". Disruption/delay/disconnect Tolerant Networks are herein referred to collectively as "DTN". In a DTN, a number of communication nodes (hereinafter referred to as "DTN nodes") autonomously relay a message (data bundle or data packet), thereby achieving the delivery of the message from a source node to a destination node. Either or both of the source node and the destination node may belong to the DTN (i.e., DTN nodes), or belong to an external network (e.g., the Internet, a public cellular network, or a wireless local area network (LAN)). If either or both of the source node and the destination node belong to an external network, any one of the DTN nodes operates as a router or gateway that relays messages between the DTN and the external network.

The DTN is based on the premise that a temporary or intermittent loss of communication occurs due to a movement of each DTN node, shielding of radio signals by an obstacle, or the like. In other words, the DTN is based on the premise that there is no stable communication path between a source node and a destination node for at least a certain period of time. To deal with a temporary or intermittent loss of communication, each DTN node performs a store-and-forward operation. Accordingly, the DTN can also be called a store-and-forward type wireless multi-hop network. Some or all of the plurality of DTN nodes constituting the DTN may be mobile terminals having mobility. In this sense, the DTN can also be called a store-and-forward type wireless ad hoc network. It is assumed that the DTN is applied to, for example, emergency communications during a disaster, and vehicle-to-vehicle communications and road-to-vehicle communications in Intelligent Transport Systems (ITS).

Patent Literature 1 discloses an improvement in message delivery between DTN nodes. Patent Literature 2 discloses an improvement in routing in the DTN.

CITATION LIST

Patent Literature

[Patent Literature 1] International Application Publication No. WO 2011/071045
[Patent Literature 2] International Application Publication No. WO 2013/076912

SUMMARY OF INVENTION

Technical Problem

As described above, each DTN node performs a store-and-forward operation. Specifically, it is necessary for each DTN node to temporarily store a message, which has been received from a certain DTN node and is destined for a destination node, in a memory (hereinafter referred to as "data buffer"). When communication with other DTN nodes is available, the DTN node transmits the message stored in the data buffer, to the other DTN nodes according to a routing protocol (e.g., an Epidemic approach, or a Spray and Wait approach). Such a store-and-forward operation is also disclosed in Patent Literature 1 and Patent Literature 2.

The inventors of the present invention have conducted a study on efficient control of a data buffer included in each DTN node. Storing a large number of messages in a data buffer of a DTN node contributes to an improvement in the success rate of message exchange in a DTN, and also contributes to an increase in the possibility that the messages reach their destination node. However, storing a large number of messages in a data buffer of a DTN node has an adverse effect that the power consumption increases. Accordingly, it is desirable to appropriately set a maximum number or maximum retention time of messages stored in a data buffer included in each DTN node.

However, it may be inappropriate that all DTN nodes in a DTN have the same value of the maximum number or maximum retention time of messages stored in their respective data buffers. This is because it is considered that DTN nodes provide different degrees of contributions to success in sending messages from a source node to a destination node via a DTN. For example, a DTN node that moves over a large geographical area is highly likely to contact a large number of other DTN nodes, and is accordingly likely to send messages to a large number of other DTN nodes when it stores a large number of messages for a relatively long period of time. On the other hand, a DTN node that moves over a small geographical area can contact with a limited number of other DTN nodes, and it may be useless for such a DTN node to store a large number of messages for a long period of time. Patent Literature 1 and Patent Literature 2 fail to disclose a technique for solving the above discussed problem related to the operation of the data buffer.

It is an object of the present invention to provide a wireless terminal device, a control method of a wireless terminal device, and a program which are capable of performing an efficient memory (data buffer) control suitable for a store-and-forward type wireless network such as a DTN.

Solution to Problem

In a first exemplary aspect of the present invention, a wireless terminal device for use in a store-and-forward type wireless network includes a wireless communication unit, a memory, and a control unit. The memory is coupled to the wireless communication unit and is configured to store messages transferred via the wireless network. The control unit is configured to adjust, based on first information, at least one of a maximum number and maximum retention time of messages stored in the memory. The first information relates to a degree of contribution of the wireless terminal device to success in sending messages from a source node to a destination node via the wireless network.

In a second exemplary aspect of the present invention, a control method of a wireless terminal device for use in a store-and-forward type wireless network includes adjusting, based on first information, at least one of a maximum number and maximum retention time of messages stored in a memory that is disposed in the wireless terminal device and is configured to store messages transferred via the wireless network. The first information relates to a degree of contribution of the wireless terminal device to success in sending messages from a source node to a destination node via the wireless network.

In a third exemplary aspect of the present invention, a program includes instructions for causing a computer to execute the control method according to the second exemplary aspect described above.

Advantageous Effects of Invention

According to aspects stated above, it is possible to provide a wireless terminal device, a control method of a wireless terminal device, and a program which are capable of performing an efficient memory (data buffer) control suitable for a store-and-forward type wireless network.

DESCRIPTION OF EMBODIMENTS

Hereinafter, exemplary embodiments will be described in detail with reference to the drawings. The same or corresponding elements are denoted by the same reference numerals throughout the drawings, and a repeated description thereof is omitted as appropriate to clarify the explanation.

First Exemplary Embodiment

Figure 1:
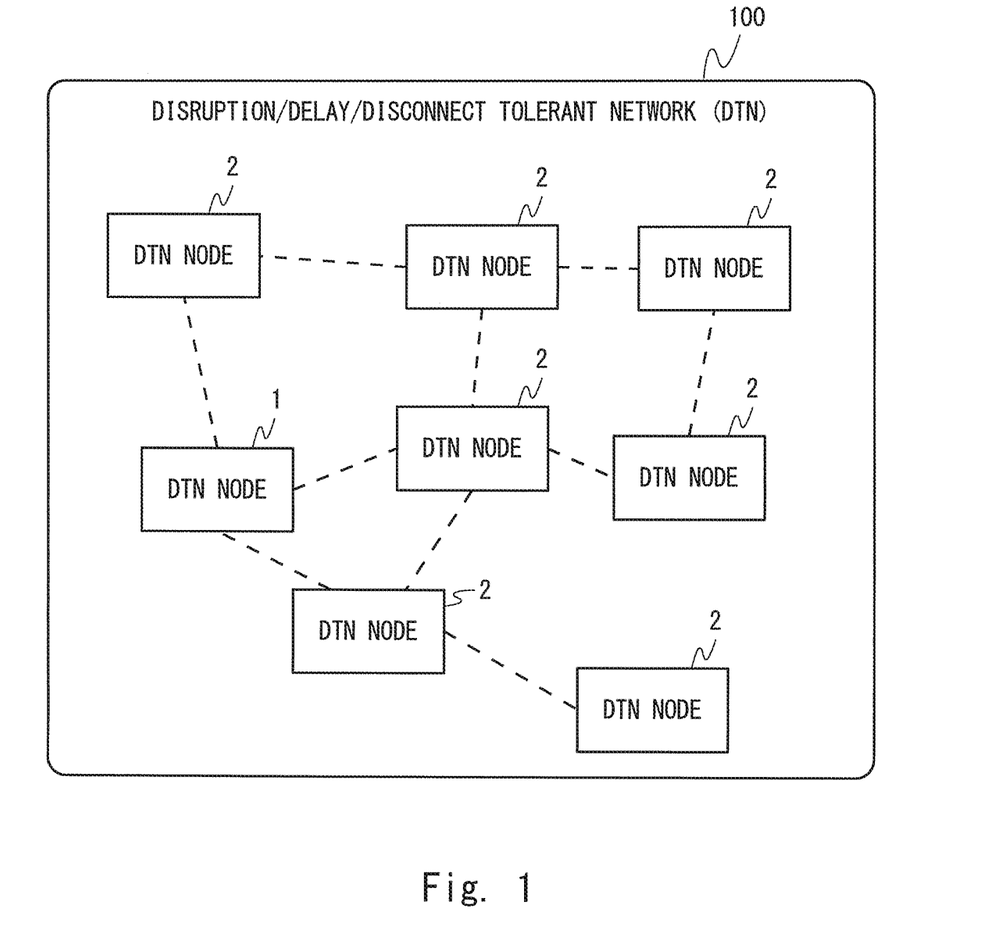
FIG. 1 is a diagram showing a configuration example of a DTN according to a first exemplary embodiment.

FIG. 1 shows a configuration example of a Disruption/Delay/Disconnect Tolerant Network (DTN) 100 according to this exemplary embodiment. The DTN 100 includes a DTN node 1 and a plurality of DTN nodes 2. These DTN nodes autonomously relay a message (data bundle or data packet), thereby achieving the delivery of the message from a source node to a destination node. As described above, either or both of the source node and the destination node may belong to the DTN 100 (DTN nodes), or belong to other networks (not shown). Other networks may include at least one of the Internet, a public cellular network, and a wireless LAN.

The DTN node 1 and the DTN nodes 2 may be mobile terminals having mobility (e.g., cellular phones, smartphones, tablet computers, or personal computers (PCs)). The DTN node 1 and the DTN nodes 2 may be communication terminals mounted in transport devices, such as vehicles, aircrafts, railway vehicles, and ships. However, some of these DTN nodes may be fixed wireless terminals such as wireless LAN access points.

The DTN node 1 and the DTN nodes 2 each perform a store-and-forward operation. In other words, the DTN nodes each include a memory (data buffer) for storing messages transferred in the DTN 100. Each DTN node stores, in the data buffer, a message which has been received from a certain DTN node and is destined for a destination node, and transmits the message stored in the data buffer to another DTN node according to a routing protocol (e.g., an Epidemic approach, or a Spray and Wait approach) when communication with the other DTN nodes is available.

The DTN node 1 operates to adjust, based on node information, at least one of a maximum number and maximum retention time of messages stored in the data buffer. The node information herein relates to a degree of contribution of the DTN node 1 to success in sending messages from the source node to the destination node via the DTN 100. More specifically, the DTN node 1 may adjust at least one of the maximum number and maximum retention time of messages stored in the data buffer in such a manner that at least one of the maximum number and the maximum retention time is increased as the degree of contribution of the DTN node 1 to success in sending messages increases.

When the degree of contribution of the DTN node 1 to success in sending messages via the DTN 100 is relatively high, the DTN node 1 may increase the maximum number or maximum retention time of messages temporarily stored therein, thereby making it possible to increase the success rate of end-to-end message transmission via the DTN 100. On the other hand, when the degree of contribution of the DTN node 1 is relatively low, the DTN node 1 reduces the maximum number or maximum retention time of messages temporarily stored therein, so that it can be expected that the power consumption of the DTN node 1 will be suppressed. Accordingly, the DTN node 1 can efficiently perform a memory (data buffer) control suitable for the DTN.

The degree of contribution of the DTN node 1 to success in sending messages via the DTN 100 can be evaluated based on various parameters or indices. Some specific examples of these are given below.

In a first example, the degree of contribution of the DTN node 1 may be evaluated based on a contribution of the DTN node 1 to message transfer in the DTN 100. In this case, the degree of contribution of the DTN node 1 may be evaluated based on, for example, the number of other DTN nodes 2 with which the DTN node 1 has contacted in the DTN 100.

More specifically, in the second example, the node information may include a history of communications between the DTN node 1 and other DTN nodes 2 in the DTN 100. This history of communications represents, for example, at least one of: (a) the number of other DTN nodes 2 detected by the DTN node 1 in the DTN 100; (b) a frequency of replacement of other DTN nodes 2 located around the DTN node 1 in the DTN 100; (c) the number of messages transferred between the DTN node 1 and other DTN nodes 2 in the DTN 100; and (d) a success rate of message transmission in the DTN 100 before deletion of the messages from the data buffer of the DTN node 1.

In a second example, the degree of contribution of the DTN node 1 may be evaluated based on a contribution of the DTN node 1 to sending messages when at least one of the source node and the destination node belongs to a network other than the DTN 100. The degree of contribution of the DTN node 1 may be evaluated based on a frequency of connection of the DTN node 1 to other networks that provide continuous communications as compared with the DTN 100. Other networks that provide continuous communications as compared with the DTN 100 may include a wireless network infrastructure. The wireless network infrastructure may include a public cellular network (e.g., a Universal Mobile Telecommunications System (UMTS) or an Evolved Packet System (EPS)), a wireless LAN, a Worldwide Interoperability for Microwave Access (WiMAX) network, or a combination thereof.

More specifically, in the second example, the node information may include a history of communications between the DTN node 1 and other networks that provide continuous communications as compared with the DTN 100. This history of communications represents, for example, at least one of: a frequency of communication of the DTN node 1 with the other networks; an elapsed time since a last connection of the DTN node 1 to the other networks; and the number of messages transferred between the DTN node 1 and the other networks.

In a third example, the degree of contribution of the DTN node 1 may be evaluated based on a contribution of the DTN node 1 to sending messages when a DTN server that relays a message between a plurality of DTNs physically separated from each other is used. The degree of contribution of the DTN node 1 may be evaluated based on a frequency of communication of the DTN node 1 with the DTN server.

More specifically, in the third example, the node information may include a history of communications between the DTN server and the DTN node 1. This history of communications includes, for example, at least one of: a frequency of communication between the DTN server and the DTN node 1; an elapsed time since a last communication of the DTN node 1 with the DTN server; and the number of messages transferred between the DTN node 1 and the DTN server.

In a fourth example, the degree of contribution of the DTN node 1 may be evaluated based on a size of a geographical area over which the DTN node 1 moves. The size of the geographical area over which the DTN node 1 moves may be calculated by using, for example, positional information acquired by a Global Positioning System (GPS) receiver disposed in the DTN node 1.

The above-mentioned first to fourth examples illustrate examples in which the degree of contribution of the DTN nodel to success in sending messages via the DTN 100 is evaluated using certain history information (i.e., a communication history or a movement history) about the DTN node 1. However, the degree of contribution of the DTN node 1 may be evaluated without using such history information. In some implementations, identification information preliminarily set in the DTN node 1 may be used.

In the case of emergency communication in a large-scale disaster such as an earthquake or tsunami, it is assumed that people who are engaged in policing, firefighting, rescuing, administrating, and the like, and their transport devices (such as vehicles and aircrafts) will frequently come and go between evacuation shelters and their support bases (e.g., police stations and administrative institutions). Accordingly, identification information indicating that the contribution to success in sending messages via the DTN is relatively high may be set to mobile terminals (e.g., cellular phones, smartphones, tablet computers, or PCs) serving as DTN nodes that are held by the people engaged in policing, firefighting, rescuing, administrating, and the like. The same holds true for communication terminals serving as DTN nodes mounted in the transport devices engaged in policing, firefighting, rescuing, administrating, and the like. On the other hand, it is assumed that ordinary citizens are highly likely to remain in the evacuation shelters. Accordingly, identification information indicating that the contribution of success in sending messages via the DTN is relatively low may be preliminarily set in the mobile terminals serving as DTN nodes that are held by the ordinary citizens.

Figure 2:
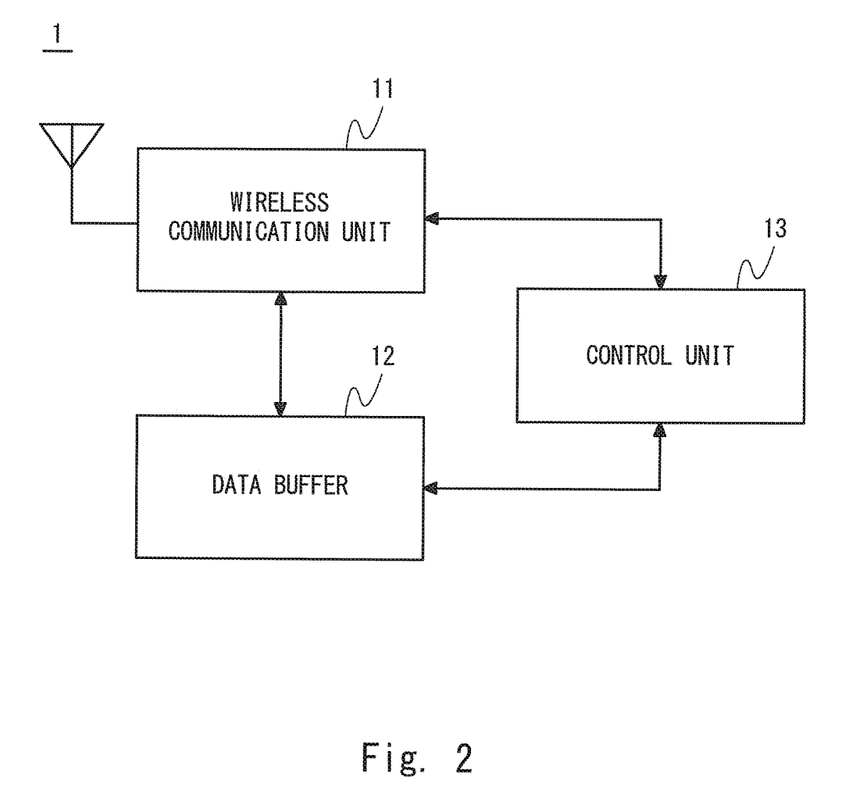
FIG. 2 is a block diagram showing a configuration example of DTN nodes according to the first exemplary embodiment.

Next, a configuration example of the DTN node 1 and the operation thereof will be described in more detail below. FIG. 2 shows a configuration example of the DTN node 1. A wireless communication unit 11 performs a wireless communication with other DTN nodes 2 in the DTN 100. Specifically, the wireless communication unit 11 includes a transceiver having a physical layer according to the wireless communication technology used in the DTN 100, and supports a protocol suite of a data link layer, a network layer, and a transport layer in the wireless communication technology used in the DTN 100. The wireless communication unit 11 also supports a bundle layer protocol. The bundle layer protocol is located between an application layer and the transport layer, and provides a store-and-forward type communication necessary for the DTN. The Protocol Data Unit (PDU) of a bundle layer may be referred to as a message or a data bundle.

A data buffer 12 can store a plurality of messages transferred via the DTN 100. The data buffer 12 may include a volatile memory, such as a Dynamic Random Access Memory (DRAM) and a Static Random Access Memory (SRAM), a non-volatile memory, such as a hard disk drive and a flash memory, or a combination thereof. Deletion of data that has been stored in the data buffer 12 is controlled by the wireless communication unit 11 or a control unit 13. For example, when the transmission of a message to a predetermined number of other DTN nodes 2 according to a routing protocol is successful, the wireless communication unit 11 or the control unit 13 may delete the message from the data buffer 12. Further, the wireless communication unit 11 or the control unit 13 may delete messages from the data buffer 12, based on the maximum number and maximum retention time of messages. For example, when the number of messages to be stored exceeds the maximum number of messages, the wireless communication unit 11 or the control unit 13 may delete messages already stored in the data buffer 12 in chronological order. Further or alternatively, the wireless communication unit 11 or the control unit 13 may delete a message from the data buffer 12 after a lapse of the maximum retention time since the message stored in the data buffer 12.

As described above, the control unit 13 may delete messages from the data buffer 12. Further, the control unit 13 adjusts, based on the node information, at least one of the maximum number and maximum retention time of messages stored in the data buffer 12. As described above, the node information relates to the degree of contribution of the DTN node 1 to success in sending messages from the source node to the destination node via the DTN 100. Specific examples of the node information have been described above.

Figure 3:
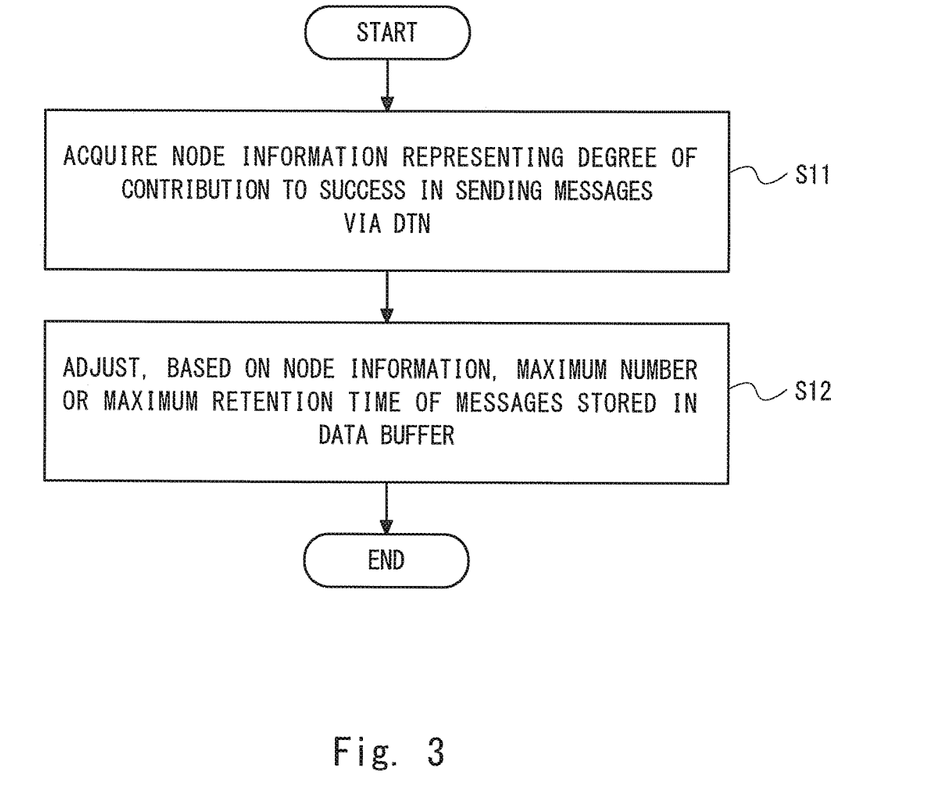
FIG. 3 is a flowchart showing an example of a method for controlling a data buffer according to the first exemplary embodiment.

FIG. 3 is a flowchart showing an example of the data buffer control process performed by the control unit 13. In step S11, the control unit 13 acquires the node information representing the degree of contribution of the DTN nodel to success in sending messages via the DTN 100. In step S12, the control unit 13 adjusts, based on the node information, at least one of the maximum number and maximum retention time of messages stored in the data buffer 12. The procedure shown in FIG. 3 may be performed periodically or aperiodically.

Figure 4:
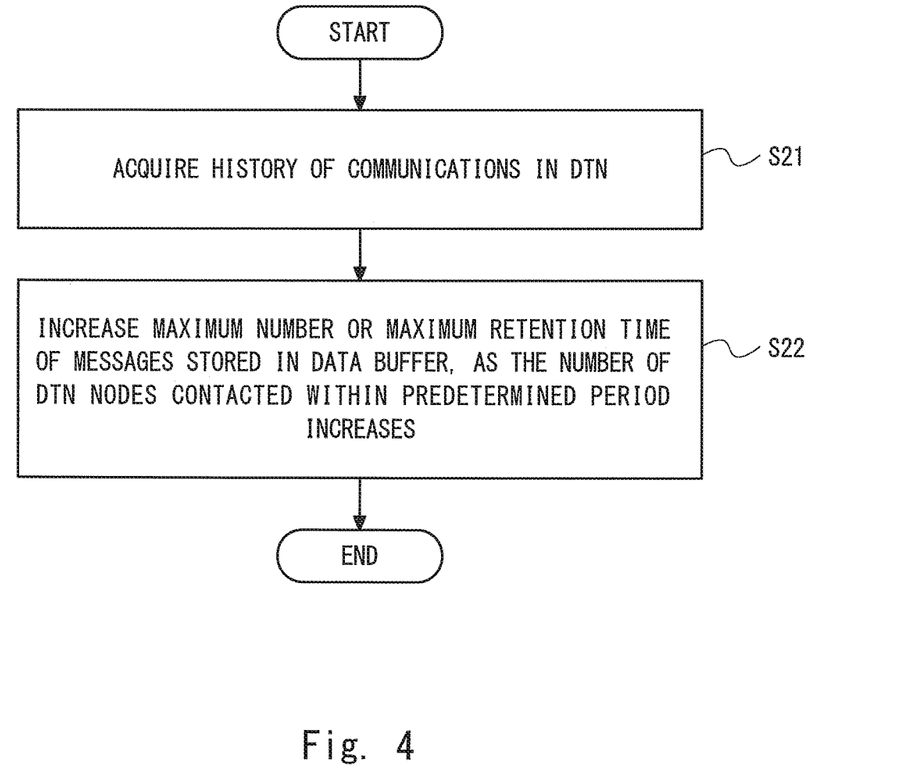
FIG. 4 is a flowchart showing an example of a method for controlling a data buffer according to the first exemplary embodiment.

FIG. 4 is a flowchart showing another example of the data buffer control process performed by the control unit 13. In the example shown in FIG. 4, the degree of contribution of the DTN node 1 to success in sending messages via the DTN 100 is evaluated based on the frequency of contact with other DTN nodes 2 in the DTN 100. Specifically, in step S21, the control unit 13 acquires the communication history of the communication node 1 in the DTN 100 as the node information. In step S22, the control unit 13 increases at least one of the maximum number and maximum retention time of messages stored in the data buffer 12, as the number of other DTN nodes 2 with which the DTN node 1 contacted within a predetermined period increases, that is, as the contact frequency of the DTN node 1 increases.

According to the procedure shown in FIG. 4, at least one of the maximum number and maximum retention time of messages stored in the data buffer 12 is increased when the DTN node 1 plays a large role in the communication within the DTN 100, and thereby the success rate of message transmission via the DTN 100 can be increased. On the other hand, according to the procedure shown in FIG. 4, at least one of the maximum number and maximum retention time of messages stored in the data buffer 12 is reduced when the DTN node 1 plays a small role in the communication within the DTN 100, and thereby the power consumption of the DTN node 1 can be suppressed.

In the procedure shown in FIG. 4, at least one other indices (e.g., a frequency of replacement of other DTN nodes 2 located around the DTN node 1, or the number of messages transferred between the DTN node 1 and other DTN nodes 2) relating to the communication within the DTN 100 may be used instead of or in combination with "a frequency of contact with other DTN nodes 2".

Examples of the data buffer control process performed by the control unit 13 will be described in more detail in second to fourth exemplary embodiments described below.

It is considered that messages transferred in the DTN 100 have different importance levels, emergency levels, or broadcast characteristics. The broadcast characteristics herein indicate that each message is a unicast message to be sent to only a specific destination node or a multicast/broadcast message to be sent to a plurality of destination nodes. The broadcast characteristics may include a broadcast level representing the number of destination nodes, or the size of a geographical area in which a plurality of destination nodes are located. Messages having different importance levels, different emergency levels, or different broadcast characteristics may be differently treated with regard to the maximum number or maximum retention time of messages stored in the data buffer 12.

For example, the maximum number or maximum retention time of stored messages belonging to a first message class of relatively high importance may be larger than that of stored messages belonging to a second message class of relatively low importance. This makes it possible to increase the success rate of transmission of important messages. Further, an increase in power consumption can be suppressed by limiting the maximum number and maximum retention time of stored messages of low importance.

The maximum number of stored messages belonging to the first message class having a relatively high level of emergency may be larger than that of stored messages belonging to the second message class having a relatively low level of emergency. On the other hand, the maximum retention time of stored messages belonging to the first message class may be smaller than that of stored messages belonging to the second message class. This is because the messages having a high level of emergency need to be more reliably and promptly delivered to destination nodes than the messages having a low level of emergency.

Further, the maximum number and maximum retention time of unicast messages stored in the data buffer 12 may be larger than those of broadcast messages. In the case of transmitting unicast messages, the destination nodes are located outside the DTN 100 in many cases. In other words, the unicast messages should be transmitted from the DTN 100 to other networks in many cases (outbound transmission). In this case, it is desirable that the DTN node 1 be able to maintain stored unicast messages which are received in the DTN 100 when there is no connection with other networks, until the connection with other networks becomes available. The success rate of unicast message transmission can be increased by setting the maximum number and maximum retention time of unicast messages stored in the data buffer 12 to larger values than those of broadcast messages stored in the data buffer 12.

Second Exemplary Embodiment

In this exemplary embodiment, a specific example of the data buffer control process performed by the DTN node 1 will be described. In this exemplary embodiment, a configuration example of the DTN 100 is similar to that shown in FIG. 1, and a configuration example of the DTN node 1 is similar to that shown in FIG. 2. That is, the DTN 100 includes the DTN node 1 and other DTN nodes 2. In this regard, however, a wireless communication unit 11 mounted in a DTN node 1 according to this exemplary embodiment has an ability to perform a communication with a wireless network infrastructure 200, as well as an ability to perform a communication in the DTN 100. That is, the wireless communication unit 11 supports the wireless communication technology used in the wireless network infrastructure 200. The wireless communication unit 11 may include a first hardware module (e.g., a high-frequency circuit, a DA converter, an AD converter, and a Digital Signal Processor (DSP)) for the DTN 100, and a second hardware module including a transceiver for the wireless network infrastructure 200. Alternatively, the wireless communication unit 11 may use one hardware module for both the communication in the DTN 100 and the communication with the wireless network infrastructure 200, by using software radio technology.

Figure 5:
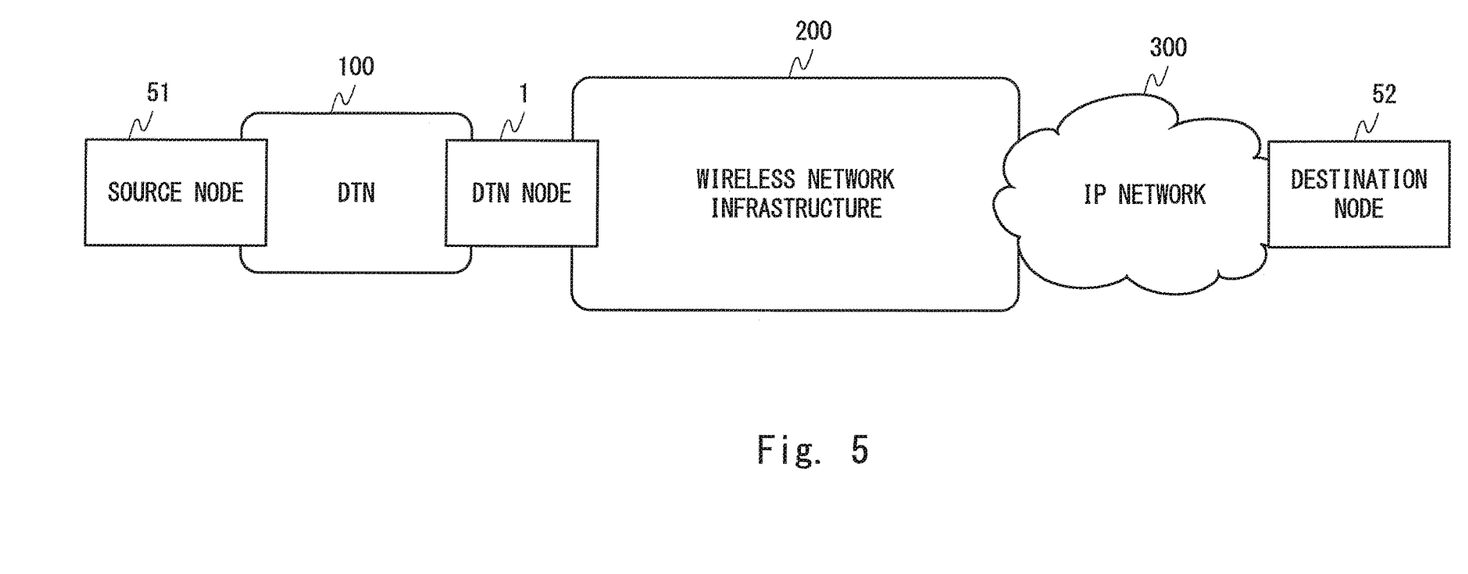
FIG. 5 is a diagram showing an example of a network configuration including a DTN according to a second exemplary embodiment.

FIG. 5 shows a configuration example of a network including the DTN 100 according to this exemplary embodiment. This exemplary embodiment assumes a case where at least one of a source node 51 and a destination node 52 of a message transmitted via the DTN is located in a network other than the DTN 100. In the example shown in FIG. 5, the source node 51 is one of the other DTN nodes 2 belonging to the DTN 100, and the destination node 52 is a node belonging to an Internet Protocol (IP) network 300. Further, in the example shown in FIG. 5, the DTN node 1 operates as a router or gateway that relays a message between the DTN 100 and the wireless network infrastructure 200. The wireless network infrastructure 200 can provide continuous communications as compared with the DTN 100. The wireless network infrastructure 200 may include a public cellular network, such as an UMTS or an EPS, a wireless LAN, a WiMAX network, or a combination thereof.

Figure 6:
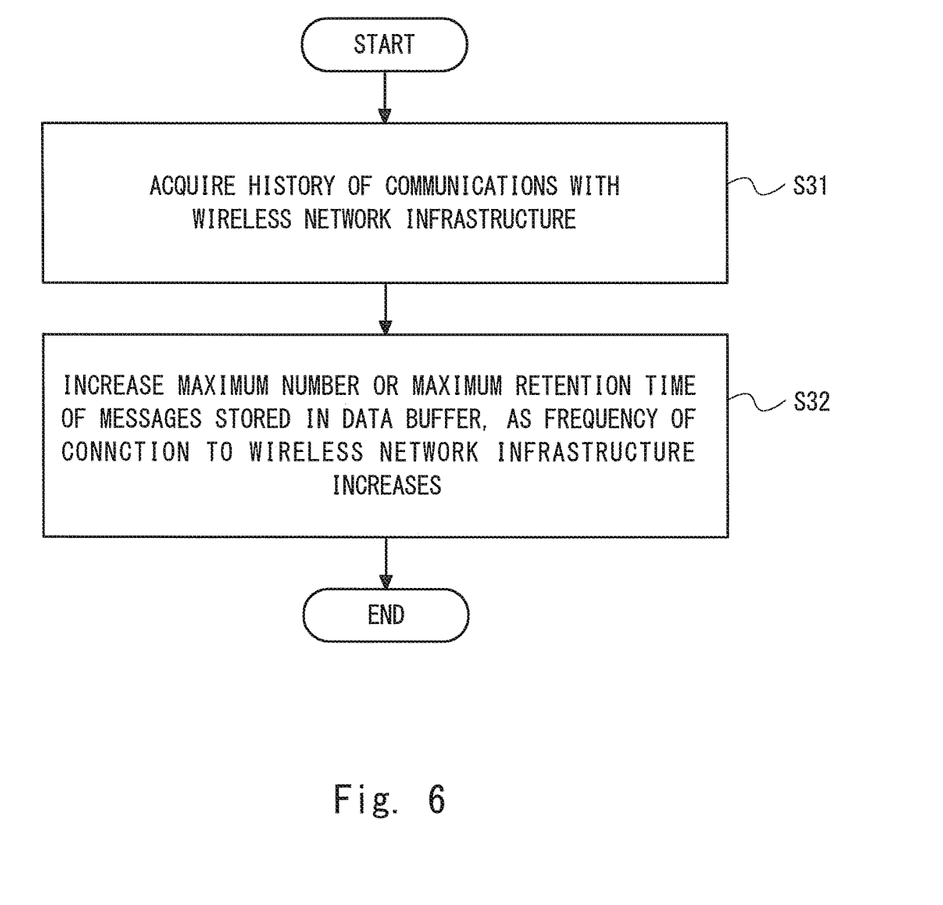
FIG. 6 is a flowchart showing an example of a method for controlling a data buffer according to the second exemplary embodiment.

FIG. 6 is a flowchart showing an example of the data buffer control process performed by the DTN node 1 (control unit 13) according to this exemplary embodiment. In the example shown in FIG. 6, the degree of contribution of the DTN node 1 to success in sending messages via the DTN 100 is evaluated based on the frequency of connection of the DTN node 1 to the wireless network infrastructure 200. Specifically, in step S31, the DTN node 1 (control unit 13) acquires the history of communications with the wireless network infrastructure 200 as the node information. In step S32, the DTN node 1 (control unit 13) increases at least one of the maximum number and maximum retention time of messages stored in the data buffer 12, as the frequency of connection of the DTN nodel to the wireless network infrastructure 200 increases.

According to the procedure shown in FIG. 6, at least one of the maximum number and maximum retention time of messages stored in the data buffer 12 is increased when the DTN node 1 plays a large role in relaying messages between the DTN 100 and other networks (the wireless network infrastructure 200 in the example shown in FIG. 5), and thereby the success rate of message transmission via the DTN 100 can be increased. On the other hand, according to the procedure shown in FIG. 6, at least one of the maximum number and maximum retention time of messages stored in the data buffer 12 is reduced when the DTN node 1 plays a small role in relaying messages between the DTN 100 and other networks, and thereby the power consumption of the DTN node 1 can be suppressed.

In the procedure shown in FIG. 6, at least one other indices (e.g., an elapsed time since a last connection of the DTN node 1 to other networks, or the number of messages transferred between the DTN node 1 and other networks) relating to the relay of messages between the DTN node 1 and other networks may be used instead of or in combination with "a frequency of connection to the wireless network infrastructure 200".

Third Exemplary Embodiment

In this exemplary embodiment, a specific example of the data buffer control process performed by the DTN node 1 will be described. In this exemplary embodiment, a configuration example of the DTN 100 is similar to that shown in FIG. 1, and a configuration example of the DTN node 1 is similar to that shown in FIG. 2. That is, the DTN 100 includes the DTN node 1 and other DTN nodes 2.

Figure 7:
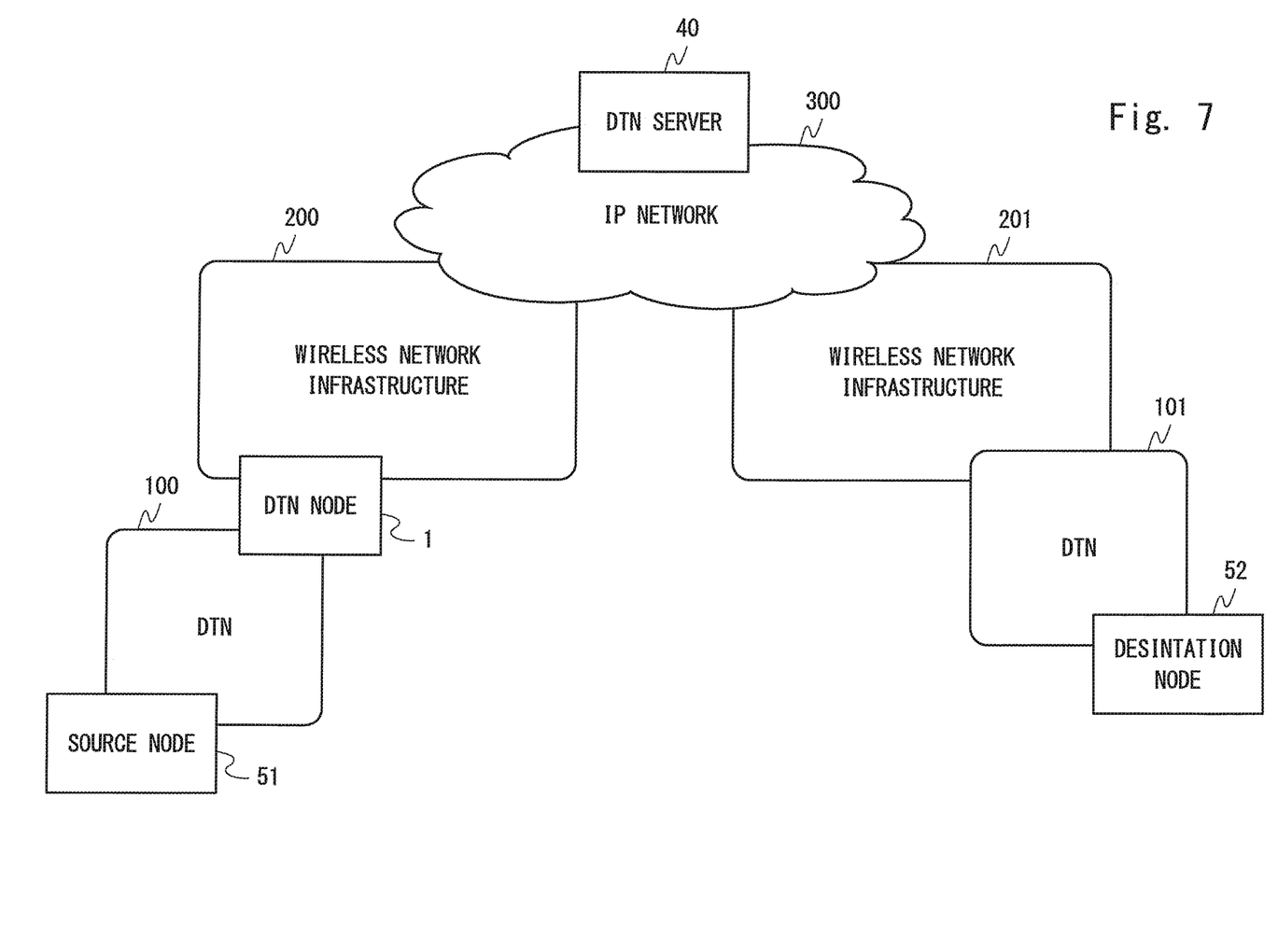
FIG. 7 is a diagram showing an example of a network configuration including a DTN according to a third exemplary embodiment.

FIG. 7 shows a configuration example of a network including the DTN 100 according to this exemplary embodiment. This exemplary embodiment assumes a case where a DTN server that relays a message between a plurality of DTNs is used. In the example shown in FIG. 7, the source node 51 is one of the other DTN nodes 2 belonging to the DTN 100, and the destination node 52 is a DTN node belonging to another DTN 101. The DTN node 1 operates as a router or gateway that relays a message between the DTN 100 and the wireless network infrastructure 200. Further, in the example shown in FIG. 7, a DTN server 40 is disposed in the IP network 300. The DTN server 40 receives, from the DTN node 1 via the wireless network infrastructure 200 and the IP network 300, a message originated from the source node 51. The DTN server 40 then transmits the message, which is originated from the source node 51, to the destination node 52 via the IP network 300, a wireless network infrastructure 201 and the DTN 101.

Figure 8:
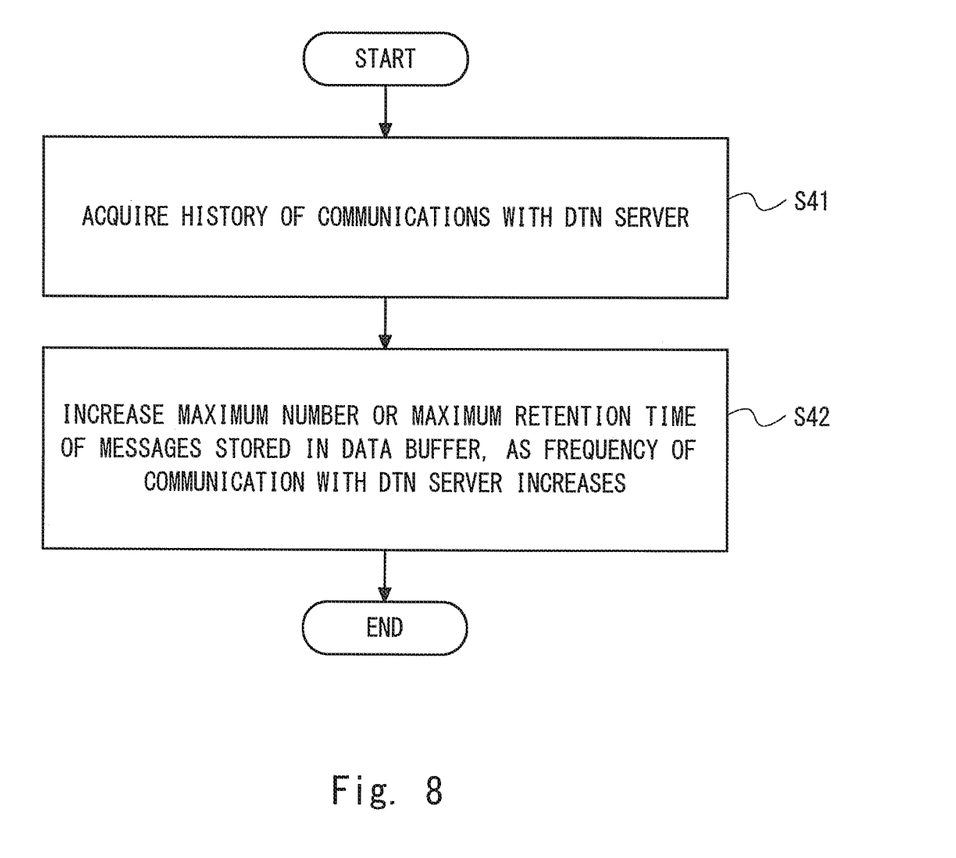
FIG. 8 is a flowchart showing an example of a method for controlling a data buffer according to the third exemplary embodiment.

FIG. 8 is a flowchart showing an example of the data buffer control process performed by the DTN node 1 (control unit 13) according to this exemplary embodiment. In the example shown in FIG. 8, the degree of contribution of the DTN node 1 to success in sending messages via the DTN 100 is evaluated based on the frequency of communication of the DTN node 1 with the DTN server 40. Specifically, in step S41, the DTN node 1 (control unit 13) acquires the history of communications with the DTN server 40 as the node information. In step S42, the DTN node 1 (control unit 13) increases at least one of the maximum number and maximum retention time of messages stored in the data buffer 12, as the frequency of communication with the DTN server 40 increases.

According to the procedure shown in FIG. 8, at least one of the maximum number and maximum retention time of messages stored in the data buffer 12 is increased when the DTN node 1 plays a large role in relaying messages between the DTN 100 and the DTN server 40, and thereby the success rate of message transmission via the DTN 100 can be increased. On the other hand, according to the procedure shown in FIG. 8, at least one of the maximum number and maximum retention time of messages stored in the data buffer 12 is reduced when the DTN node 1 plays a small role in relaying messages between the DTN 100 and the DTN server 40, and thereby the power consumption of the DTN node 1 can be suppressed.

In the procedure shown in FIG. 8, at least one other indices (e.g., an elapsed time since a last communication of the DTN node 1 with the DTN server 40, or the number of messages transferred between the DTN node 1 and the DTN server 40) relating to the communication between the DTN node 1 and the DTN server 40 may be used instead of or in combination with "a frequency of communication of the DTN node 1 with the DTN server 40".

Fourth Exemplary Embodiment

In this exemplary embodiment, a specific example of the data buffer control process performed by the DTN node 1 will be described. In this exemplary embodiment, a configuration example of the DTN 100 is similar to that shown in FIG. 1, and a configuration example of the DTN node 1 is similar to that shown in FIG. 2. That is, the DTN 100 includes the DTN node 1 and other DTN nodes 2.

Figure 9:
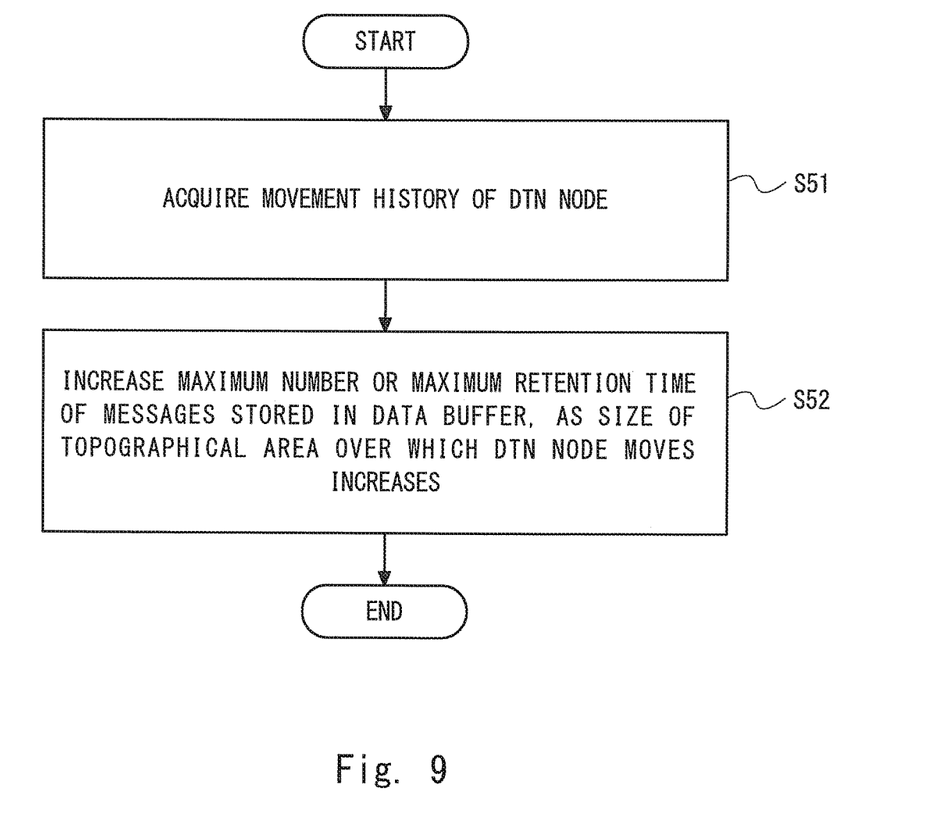
FIG. 9 is a flowchart showing an example of a method for controlling a data buffer according to a fourth exemplary embodiment.

FIG. 9 is a flowchart showing an example of the data buffer control process performed by the DTN node 1 (control unit 13) according to this exemplary embodiment. In the example shown in FIG. 9, the degree of contribution of the DTN node 1 to success in sending messages via the DTN 100 is evaluated based on the size of the geographical area over which the DTN node 1 moves. Specifically, in step S51, the DTN node 1 (control unit 13) acquires the movement history of the DTN node 1. The movement history of the DTN node 1 may be calculated based on positional information acquired by a GPS receiver. In step S52, the DTN node 1 (control unit 13) increases at least one of the maximum number and maximum retention time of messages stored in the data buffer 12, as the geographical area over which the DTN node 1 moves, obtained based on the movement history, increases.

When the area of movement of the DTN node 1 is large, it can be expected that the DTN node 1 is more likely to contact a large number of other DTN nodes 2, or that the DTN node 1 is more likely to be connected to the wireless network infrastructure. Therefore, according to the procedure shown in FIG. 9, at least one of the maximum number and maximum retention time of messages stored in the data buffer 12 is increased when the area of movement of the DTN node 1 is large, and thereby the success rate of message transmission via the DTN 100 can be increased. On the other hand, according to the procedure shown in FIG. 9, at least one of the maximum number and maximum retention time of messages stored in the data buffer 12 is reduced when the area of movement of the DTN node 1 is small, and thereby the power consumption of the DTN node 1 can be suppressed.

Other Embodiments

The above-described exemplary embodiments may be practiced by combining these exemplary embodiments as desirable.

The above-described exemplary embodiments have been described by using the Disruption/Delay/Disconnect Tolerant Network (DTN) as a specific example. However, the disclosure of the above-described exemplary embodiments can be widely applied to a store-and-forward type wireless network, such as a Delay Tolerant Network, a store-and-forward type wireless multi-hop network, or a store-and-forward type wireless ad hoc network.

The data buffer control process performed by the DTN node 1 described in the above-described exemplary embodiments may also be implemented by causing a computer system to execute a program. Specifically, one or more programs including instructions for causing a computer system to perform the algorithm described above with reference to the flowcharts may be prepared, and may be supplied to the computer system.

These programs can be stored and provided to a computer using any type of non-transitory computer readable media. Non-transitory computer readable media include any type of tangible storage media. Examples of non-transitory computer readable media include magnetic storage media (e.g., floppy disks, magnetic tapes, and hard disk drives), optical magnetic storage media (e.g. magneto-optical disks), CD-ROM (Compact Disc Read Only Memory), CD-R, CD-R/W, and semiconductor memories (e.g., mask ROM, PROM (Programmable ROM), EPROM (Erasable PROM), flash ROM, RAM (Random Access Memory), etc.). The programs may be provided to a computer using any type of transitory computer readable media. Examples of transitory computer readable media include electric signals, optical signals, and electromagnetic waves. Transitory computer readable media can provide the programs to a computer via a wired communication line, such as electric wires and optical fibers, or a wireless communication line.

The above-described exemplary embodiments are merely examples of the application of the technical idea obtained by the inventors of the present invention. In other words, the technical idea is not limited only to the above-described exemplary embodiments, but can be modified in various manners.

This application is based upon and claims the benefit of priority from Japanese Patent Application No. 2013-234549, filed on Nov. 13, 2013, and the disclosure of which is incorporated herein in its entirety by reference.

REFERENCE SIGNS LIST 1, 2 DISRUPTION/DELAY/DISCONNECT TOLERANT NETWORK (DTN) NODES
11 WIRELESS COMMUNICATION UNIT
12 DATA BUFFER
13 CONTROL UNIT
40 DISRUPTION/DELAY/DISCONNECT TOLERANT NETWORK (DTN) SERVER
51 SOURCE NODE
52 DESTINATION NODE
100, 101 DISRUPTION/DELAY/DISCONNECT TOLERANT NETWORKS (DTNs)
200, 201 WIRELESS NETWORK INFRASTRUCTURE
300 INTERNET PROTOCOL (IP) NETWORK

What is claimed is:

1. A wireless terminal device for use in a store-and-forward type wireless network, the wireless terminal comprising:
   a wireless communication unit;
   a memory coupled to the wireless communication unit and configured to store messages transferred via the wireless network; and
   at least one hardware processor configured to adjust at least one of a maximum number and maximum retention time of messages stored in the memory, depending on identification information assigned to and stored in the wireless terminal device, wherein
   at least one of the maximum number and the maximum retention time is increased when the identification information is set to a first value indicating that contribution of the wireless terminal device to success in sending messages from a source node to a destination node via the wireless network is relatively high, as compared to when the identification information is set to a second value indicating the contribution id relatively low.

2. The wireless terminal device according to claim 1, wherein the at least one hardware processor is configured to adjust at least one of the maximum number and the maximum retention time in such a manner that at least one of the maximum number and the maximum retention time is increased as the degree of contribution increases.

3. The wireless terminal device according to claim 1, wherein the degree of contribution is evaluated based on a frequency of connection of the wireless terminal device to other communication networks.

4. The wireless terminal device according to claim 1, wherein
   the wireless network includes a plurality of terminal groups physically separated from each other, and
   the degree of contribution is evaluated based on a frequency of communication between the wireless terminal device and a server that relays a message between the plurality of terminal groups.

5. The wireless terminal device according to claim 1, wherein the degree of contribution is evaluated based on a size of a geographical area over which the wireless terminal device moves.

6. The wireless terminal device according to claim 1, wherein the at least one hardware processor is configured to adjust at least one of the maximum number and the maximum retention time further depending on a first history of communications between the wireless terminal device and other wireless terminals in the wireless network.

7. The wireless terminal device according to claim 6, wherein the first history of communications represents at least one of: (a) the number of other wireless terminals detected by the wireless terminal device in the wireless network; (b) a frequency of replacement of other wireless terminals located around the wireless terminal device in the wireless network; (c) the number of messages transferred between the wireless terminal device and other wireless terminals in the wireless network; (d) a success rate of transmission of messages in the wireless network before deletion of the messages from the memory; and (e) a frequency of connection to other wireless terminals in which a degree of contribution to success in sending messages via the wireless network is high.

8. The wireless terminal device according to claim 1, wherein the at least one hardware processor is configured to adjust at least one of the maximum number and the maximum retention time further depending on a second history of communications between the wireless terminal device and other communication networks.

9. The wireless terminal device according to claim 8, wherein the second history of communications represents at least one of: the number of the other communication networks to which the wireless terminal device is connected; a frequency of connection of the wireless terminal device to the other communication networks; an elapsed time since a last connection of the wireless terminal device to the other communication networks; and the number of messages transferred between the wireless terminal device and the other communication networks.

10. The wireless terminal device according to claim 8, wherein the other communication networks include at least one of a wireless local area network (LAN) and a public cellular network.

11. The wireless terminal device according to claim 1, wherein
the wireless network includes a plurality of terminal groups physically separated from each other, and
the at least one hardware processor is configured to adjust at least one of the maximum number and the maximum retention time further depending on a third history of communications between the wireless terminal device and a server that relays a message between the plurality of terminal groups.

12. The wireless terminal device according to claim 11, wherein the third history of communications represents at least one of: a frequency of communication of the wireless terminal device with the server; an elapsed time since a last communication of the wireless terminal device with the server; and the number of messages transferred between the wireless terminal device and the server.

13. The wireless terminal device according to claim 1, wherein
each message transferred in the wireless network is assigned to a first class or a second class, the first and second classes being distinguished by a level of emergency or broadcast characteristics, and
the at least one hardware processor is configured to apply a maximum number or maximum retention time to messages assigned to the first class which is different from that applied to messages assigned to the second class.

14. A control method performed by a wireless terminal device for use in a store-and-forward type wireless network, the control method comprising:
adjusting, depending on identification information assigned to and stored in the wireless terminal device, at least one of a maximum number and maximum retention time of messages stored in a memory that is disposed in the wireless terminal device and is configured to store messages transferred via the wireless network, wherein the adjusting includes increasing at least one of the maximum number and the maximum retention time when the identification information is set to a first value indicating that contribution of the wireless terminal device to success in sending messages from a source node to a destination node via the wireless network is relatively high, as compared to when the identification information is set to a second value indicating the contribution is relatively low.

15. The control method according to claim 14, wherein the adjusting includes adjusting at least one of the maximum number and the maximum retention time in such a manner that at least one of the maximum number and the maximum retention time is increased as the degree of contribution increases.

16. The control method according to claim 14, wherein the degree of contribution is evaluated based on a frequency of connection of the wireless terminal device to other communication networks.

17. The control method according to claim 14, wherein
the wireless network includes a plurality of terminal groups, and
the degree of contribution is evaluated based on a frequency of communication of the wireless terminal device with a server that relays a message between the plurality of terminal groups.

18. The control method according to claim 14, wherein the degree of contribution is evaluated based on a size of a geographical area over which the wireless terminal device moves.

19. The control method according to claim 14, wherein the adjusting includes adjusting at least one of the maximum number and the maximum retention time further depending on a first history of communications between the wireless terminal device and other wireless terminals in the wireless network.

20. The control method according to claim 19, wherein the first history of communications represents at least one of: (a) the number of other wireless terminals detected by the wireless terminal device in the wireless network; (b) a frequency of replacement of other wireless terminals located around the wireless terminal device in the wireless network; (c) the number of messages transferred between the wireless terminal device and other wireless terminals in the wireless network; (d) a success rate of transmission of messages in the wireless network before deletion of the messages from the memory; and (e) a frequency of connection to other wireless terminals in which a degree of contribution to success in sending messages via the wireless network is high.

21. The control method according to claim 14, wherein the adjusting includes adjusting at least one of the maximum number and the maximum retention time further depending on a second history of communications between other communication networks and the wireless terminal device.

22. The control method according to claim 21, wherein the second history of communications represents at least one of: the number of the other communication networks to which the wireless terminal device is connected; a frequency of connection of the wireless terminal device to the other communication networks; an elapsed time since a last connection of the wireless terminal device to the other communication networks; and the number of messages transferred between the wireless terminal device and the other communication networks.

23. The control method according to claim 21, wherein the other communication networks include at least one of a wireless local area network (LAN) and a public cellular network.

24. The control method according to claim 14, wherein
the wireless network includes a plurality of terminal groups, and
the adjusting includes adjusting at least one of the maximum number and the maximum retention time further depending on a third history of communications between the wireless terminal device and a server that relays a message between the plurality of terminal groups.

25. The control method according to claim 24, wherein the third history of communications represents at least one of: a frequency of communication of the wireless terminal device with the server; an elapsed time since a last communication of the wireless terminal device with the server; and the number of messages transferred between the wireless terminal device and the server.

26. The control method according to claim 14, wherein
each message transferred in the wireless network is assigned to a first class or a second class, the first and second classes being distinguished from each other by a level of emergency, or broadcast characteristics, and
the adjusting includes applying a maximum number or maximum retention time to messages assigned to the first class which is different from that applied to messages assigned to the second class.

27. A non-transitory computer readable medium storing a program for causing a computer to perform a control method, wherein
the control method comprises adjusting, depending on identification information assigned to and stored in the wireless terminal device, at least one of a maximum number and maximum retention time of messages stored in a memory that is disposed in the wireless terminal device and is configured to store messages transferred via the wireless network, and
the adjusting includes increasing at least one of the maximum number and the maximum retention time when the identification information is set to a first value indicating that contribution of the wireless terminal device to success in sending messages from a source node to a destination node via the wireless network is relatively high, as compared to when the identification information is set to a second value indicating the contribution is relatively low.

* * * * *